United States Patent
Tsunekane et al.

(10) Patent No.: US 6,532,248 B2
(45) Date of Patent: Mar. 11, 2003

(54) DIODE-LASER SIDE-PUMPED SOLID-STATE LASER DEVICE

(75) Inventors: Masaki Tsunekane, Tokyo (JP); Shuetsu Kudo, Tokyo (JP); Katsuji Mukaihara, Tokyo (JP); Hideyuki Moribe, Tokyo (JP); Takashi Ooyama, Kanagawa (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 09/793,362

(22) Filed: Feb. 26, 2001

(65) Prior Publication Data
US 2001/0033596 A1 Oct. 25, 2001

(30) Foreign Application Priority Data

Feb. 28, 2000 (JP) .................................. 2000-051149

(51) Int. Cl.[7] .............................................. H01S 3/093
(52) U.S. Cl. ................................. 372/72; 372/34; 372/71
(58) Field of Search .............................. 372/72, 71, 70, 372/36, 34, 35, 75, 99, 69

(56) References Cited

U.S. PATENT DOCUMENTS

| 4,140,979 | A | * | 2/1979 | Ramer | 372/72 |
| 5,521,932 | A | * | 5/1996 | Marshall | 372/36 |
| 5,548,608 | A | * | 8/1996 | Zhang | 372/72 |
| 5,867,324 | A | * | 2/1999 | Kmetec et al. | 372/71 |
| 5,999,554 | A | * | 12/1999 | Marshall | 372/71 |

FOREIGN PATENT DOCUMENTS

| JP | 4-35077 | 2/1992 |
| JP | 7-94813 | 4/1995 |
| JP | 8-181368 | 7/1996 |
| JP | 10-84150 | 3/1998 |
| JP | 10-135539 | 5/1998 |
| JP | 10-275952 | 10/1998 |
| JP | 10-326927 | 12/1998 |
| JP | 11-17252 | 1/1999 |
| JP | 11-163446 | 6/1999 |
| JP | 11-284253 | 10/1999 |
| JP | 11-284256 | 10/1999 |

OTHER PUBLICATIONS

J.J. Kasinski, et al., "One Joule Output From A Diode–Array–Pumped Nd: YAG Laser With Side–Pumped Rod Geometry", *IEEE Journal of Quantum Electronics*, vol. 28, No. 4, Apr. 1992, pp. 977–985.

D. Golla, et al., "300–W cw Diod–Laser Side–Pumped Nd: YAG Rod Laser", *Optics Letters*, vol. 20, No. 10, May 15, 1995, pp. 1146–1150.

* cited by examiner

*Primary Examiner*—Albert W. Paladini
(74) *Attorney, Agent, or Firm*—Dickstein, Shapiro, Morin & Oshinsky, LLP.

(57) ABSTRACT

A diode-laser side-pumped solid-state laser device (SSLD) has a cylindrical laser rod, a cooling tube, and a cylindrical mirror member having an inner mirror surface and a plurality of openings therein for introducing pumping laser. The laser rod receives the pumping laser, absorbs a portion of the pumping laser, and passes and focus the remaining portion of the pumping laser at a focal point disposed on the mirror surface. Substantially all the remaining portion of the pumping laser is reflected to be received and absorbed by the laser rod.

20 Claims, 13 Drawing Sheets

DIODE-LASER SIDE-PUMPED SOLID-STATE LASER DEVICE

BACKGROUND OF THE INVENTION (a) Field of the Invention

The present invention relates to a diode-laser side-pumped solid-state laser device and, more particularly, to a solid-state laser device pumped by a semiconductor laser diode to generate a solid-state laser beam with a higher brightness and a higher efficiency.

(b) Description of the Related Art

As a pumping (exciting) scheme for a solid-state laser device such as having a Nd:YAG laser medium, pumping of the solid-state laser device by using a semiconductor laser diode (referred to as simply "laser diode" hereinafter) is now highlighted due to a higher absorbing efficiency thereof by the laser medium compared to the lamp-pumping scheme for the solid-state laser device. This type of solid-state laser device (SSLD) uses the laser diode as a pumping light source having a longer lifetime, smaller dimensions and higher efficiency.

A variety of SSLDs using a side-pumping scheme have been proposed heretofore, wherein a large number of laser diodes are arranged in an array on the side surface of an elongate solid laser medium, such as a cylindrical solid laser rod, along the lasing axis of the solid laser rod. The laser diode has inherently a linear brightness distribution, which suitably matches with the side-pumping scheme.

FIG. 1 shows a sectional view of a conventional SSLD using the side-pumping scheme, as described in "IEEE Journal of Quantum Electronics" 1992, Vo. 28, No.4, pp977–985. The SSLD has a cylindrical solid laser rod (Nd:YAG laser rod) 1 extending normal to the sheet of FIG. 1. The laser rod 1 is encircled with a cooling tube 3 having an inner diameter larger than the outer diameter of the laser rod 1. The space between the laser rod 1 and the cooling tube 3 is filled with a cooling medium 2 flowing therebetween for cooling the laser rod 1.

In the vicinity of the outer surface of the cooling tube 3, a large number of laser diodes 100a to 100h are arranged, with four laser diodes 100a to 100d being arranged for a unit length of the laser rod 1 and separated from one another by a uniform angular distance with respect to the central axis of the laser rod 1. Other four laser diodes 100e to 100h in another array are deviated from the array of laser diodes 100a to 100h by 45 degrees as viewed along the axis of the laser rod 1. This configuration provides eight pumping directions to improve the axial symmetry of the energy absorption distribution for the pumping laser by the laser rod 1.

In the SSLDs using the side-pumping scheme and described in Patent Publications JP-A-10-326927 and —10-84150, the laser beam emitted by each of the laser diodes diverges to a whole angle as large as 30 degrees in the direction normal to the active layer of the laser diode. Thus, the laser diodes should be disposed in close proximity with the laser rod 1 in order to efficiently emit the laser beam toward the laser crystal.

In the exemplified SSLD of FIG. 1, the distance between the emission end surface of each of the laser is diodes 100a to 100h and the cooling tube 3 is as small as 1 mm. Although the laser diode has a small chip size, the overall dimensions of the laser diode are equivalent to the diameter of the laser rod, because the laser diode has a mount member for the chip and a cooling device such as a Peltier element or cooling water path. This prevents a large number of laser diodes from being disposed for a unit length of the laser rod, and impedes a higher output power of the SSLD.

For alleviating the difficulty of arrangement of a large number of laser diodes in close proximity of the laser rod, it is considered to prevent the divergence of the laser beam from the laser diode by using an optical unit such as a lens, thereby efficiently emitting the laser beams from the laser diodes toward the side surface of the laser rod. In an alternative, it is also known that an elongate optical waveguide encircling the laser rod is provided for guiding the laser beams emitted from a large number of laser diodes toward the laser crystal of the laser rod.

The SSLD of FIG. 1 has a disadvantage in that the power efficiency of the pumping laser beam is relatively low because some of the laser beam passes the laser rod without being absorbed by the laser rod.

FIG. 2 shows another conventional SSLD using the side-pumping scheme, described in "Optics Letter" 1995, vol. 20, No. 10, pp1148–1150. In the SSLD, a cylindrical lens (collimate lens) 101a, for example, disposed in close proximity of the laser diode 100a collimates a laser beam component (advanced-phase-axis component), which is normal to the thickness direction of the active layer. This alleviates divergence of the pumping laser beam 106 emitted from the laser diode 100, and allows the pumping laser beam 106 to transmit in the space toward the side surface of the laser rod 1. Thus, a large number (nine at a maximum in this example) of laser diodes 100 can be disposed around the circumference of the laser rod 1 for a unit length thereof due to a large distance between the laser diode 100 and the laser rod 1.

In the SSLD of FIG. 2, a portion of the pumping laser beam 106 (106a or 106b) not absorbed in the laser rod 1 and passing the same is reflected by mirrors 104 (104a or 104b) surrounding the cooling tube 3. For example, the pumping laser beam 106a is irradiated onto the laser rod 1 through a slit formed between adjacent mirrors 104f and 104g, and is absorbed or passed by the laser rod 1. The laser beam passed by the laser rod 1 is then reflected by a corresponding mirror 104a toward the laser rod 1.

The SSLD of FIG. 2 has a disadvantage in that a portion of the laser beam which is not absorbed by the laser rod 1 passes the slit of the mirror member and thus is not recovered for absorption. More specifically, when a parallel ray of the pumping laser beam is incident onto the cylindrical laser rod 1, some of the laser beam not absorbed and passed by the laser rod 1 is focused and then diverged. The diverged laser beam is more likely to pass through the slit without being reflected by the mirror member.

Patent Publications JP-A-11-284256 and —11-284253 describe SSLDs having reflecting mirrors similarly to the SSLD of FIG. 2. FIG. 3 shows the SSLD described in JP-A-11-284256, wherein the advanced-phase-axis component of the pumping laser beam 6 collimated by a rod lens (not shown) is irradiated through a slit 135 formed in a mirror member 134, which is located on the outer periphery of the cylindrical body 133 encircling the solid laser rod 1. The space between the laser rod 1 and the cylindrical member 133 is filled with a cooling medium, and the cylindrical member 133 alleviates the convex lens function of the laser rod 1. A portion of the pumping laser not absorbed by the laser rod 1 is focused at a focal point in the vicinity of the laser rod 1.

The focused laser beam portion 6t is then reflected by a corresponding mirror 134 toward the laser rod 1 after a moderate divergence. The moderate divergence, effected by the alleviation of the convex lens function of the laser rod 1 and shown by a small diameter "d" of the laser beam 6, allows the effective reflection area of the mirror member 134 to be maintained larger irrespective of the presence of a number of the slits 135 formed therein.

The SSLD of FIG. 3 has a disadvantage in that the cylindrical body has a larger thickness and thus has a larger weight and a higher equipment cost. In addition, a larger number of laser beams in different directions reduces effective reflection of the mirror member due to the larger number of openings disposed for introducing the laser beams.

Patent Publication JP-A-11-284253 describes the SSLD shown in FIG. 4, wherein a reflecting layer 144 is provided on the outer surface of the cooling tube 3 for reflecting laser beams passed by the laser rod 1 toward the laser rod 1 again. The laser beams are irradiated from the direction where the reflecting layer is not disposed.

The SSLD of FIG. 4 has a disadvantage in that it is difficult to form the reflecting layer having a slit on the outer surface of the cooling tube 3 at a low cost. In addition, a strict alignment accuracy is needed between the pumping laser and the slit, which complicates the fabrication process for the SSLD.

Patent Publication JP-A-4-35077 describes the SSLD shown in FIG. 5, wherein the pumping laser beams 106a to 106c from laser diodes 100a to 100c are transmitted to the laser rod 1 by using respective waveguides 105 instead of optical unit such as lens.

The SSLD has a disadvantage similar to that of the SSLD of FIG. 1.

Patent Publications JP-A-7-94813, 10-135539 and 11-17252 describe SSLDs each using a wedge glass plate (or tapered glass plate) having a larger thickness at the receiving end compared to the emission end, thereby improving the optical coupling efficiency between the laser diode and the glass plate.

FIG. 6 shows the SSLD described in JP-A-8-181368, wherein a pair of laser beams 116a and 116b are irradiated to the side surfaces of the laser rod 1 via a pair of waveguide plates (waveguides) 115a and 115b. Each of the laser diodes (not shown) is coupled to a corresponding waveguide 115a or 115b directly or through a lens. The laser rod 1 and the cooling tube 2 are encircled by a reflecting member 114, which reflects the laser beams a plurality of times until the laser beams are absorbed. This affords the advantage of uniform absorption density of laser beams in the radial direction.

The SSLD of FIG. 6 has a configuration for effectively introducing the pumping laser into the laser rod by preventing the pumping laser from travelling around the laser rod within the space between the laser rod and the cooling tube. For this purpose, the cross-sectional area of the mirror should be equivalent to the cross-sectional area of the laser rod, which is difficult to achieve however, The difficulty arises partly from the presence of the cooling tube separating the laser rod and the mirror surface.

If the equivalence between the cross-sectional areas is not achieved, the amount of the pumping laser not absorbed by the laser rod remains low. In addition, a long time of operation causes deterioration and contamination of the mirror surface, which further increases the amount of pumping laser not absorbed by the laser rod.

FIG. 7 shows the SSLD described in JP-A-10-275952, wherein four laser beams are irradiated toward the laser rod 1 from respective directions. The optical axis of each laser beam is deviated from the central axis of the laser rod 1 by a specified distance 118. The specified distance 118 allows a uniform heat distribution within the laser rode 1. The SSLD of FIG. 7 suffers problems, however, similar to those of the SSLD of FIG. 6.

FIG. 8 shows the SSLD described in JP-A-11-163446, wherein the incident laser beam emitted from the waveguide 125 is deflected due to the inclined surface of the emission end of the waveguide 125 with respect to the optical axis or central axis of the waveguide 125. The deflected laser beam is subjected to divergence and reflected by a mirror surface before incident onto the laser rod 1. This affords a uniform energy absorption distribution in the radial direction. The SSLD of FIG. 8, however, suffers from the problems similar to those of the SSLD of FIG. 6.

There are similar problems in the conventional SSLDs having optical waveguides (waveguide medium or waveguide plates). In addition, the optical lens used for introducing a larger amount of the pumping laser to the waveguide has an optical loss around 5 to 10%, necessitates an accurate position alignment, and thus raises the equipment cost.

The problem that an optimum absorption distribution is difficult to achieve in the SSLD used for mechanical machining will be described hereinafter. In general, for a higher performance of the SSLD in practical applications, it is important to raise the energy conversion ratio, i.e., the ratio of the output power of the SSLD to the power of the pumping laser, and to obtain a higher brightness of the laser beam. The latter may be obtained by a higher focusing capability of the laser beam, i.e., to a small-diameter beam.

For achieving a higher energy conversion ratio, the lasing mode volume in the laser rod should suitably overlap with the absorption distribution of the pumping laser. It is known that the outer periphery of the lasing mode volume in the lasing rod is deviated from the outer periphery of the whole laser rod toward the center of the laser rode even in the case of the maximum thereof. This is due to the diffraction or scattering loss (so-called aperture effect) occurring in the vicinity of the side surface of the laser rod. In other words, the pumping laser absorbed in the vicinity of the side surface of the laser rod is hardly converted to the solid laser energy.

Thus, the pumping laser should be absorbed in the vicinity of the rod center for raising the energy conversion efficiency. In addition, for a higher brightness of the laser beam, a lower-order transverse mode electric field component should be increased, with the laser mode volume being constant. As is well known, since the lower-order transverse mode electric field has a larger electric field lasing component, the pumping laser should be absorbed in more vicinity of the rode center for obtaining a higher gain, which results in dominance by the lower-order mode lasing. Conversely, if the absorbed energy of the pumping laser is reduced in the periphery of the laser rod, a higher-order mode lasing is suppressed, thereby raising the brightness of the laser beam. The conventional SSLDs are evaluated hereinafter from these view points.

FIG. 9 shows absorption distribution of the pumping laser, which is plotted on ordinate against the radial distance from the center of the lasing rod in the SSLD of FIG. 2 plotted on abscissa. As described before, the absorption of the pumping laser should be effected in more vicinity of the center of the laser rod for obtaining a higher energy conversion efficiency and a higher beam intensity. The present inventor, however, found from the experiments the phenomenon that the laser characteristics are in fact degraded, i.e., the laser output power is reduced or the beam is degraded, if the pumping laser beam is excessively concentrated in the vicinity of the rod center at a rate which is four times higher compared to the peripheral area of the laser rod, or if the pumping laser energy is excessively high, e.g., higher than $15 \times 10^8$ watts/m$^3$.

The above phenomenon results from the fact that the excessively higher ratio of the absorbed pumping laser power between rode center and the side surface of the laser rod results in a higher temperature gradient in the laser rod to raise the thermal lens effect and raise the non linear lens effect of the refractive index. The latter is due to the non-linear temperature dependency of the refractive index. The phenomenon is also considered to result from the fact that the distortion due to the temperature gradient generates a large birefringence, thereby raising the circuit loss.

FIG. 10 shows a desired energy absorption distribution which is designed for the SSLDs of FIGS. 6 and 7. It will be understood from the above reasons that a uniform energy absorption distribution with respect to the radial distance hardly affords a higher energy efficiency or a higher laser intensity. Thus, in FIG. 10, solid line showing the desired absorption distribution is raised in the vicinity of the rod center as compared to the dotted line showing a uniform distribution. In the SSLDs of FIGS. 1 and 2, it is recited that the pumping energy distribution should be raised in the vicinity of the rod center. The commercial dominance by these SSLDs over the other conventional SSLDs is due to the fact that an optimum absorption distribution is not necessarily obtained by the mere higher energy absorption in the vicinity of the rod center.

There is also a problem in the conventional SSLDs that the range of the control in the pumping distribution is narrow. In the conventional SSLD of FIG. 7, it is proposed that the optical axis of the pumping laser be a specified distance apart from the central axis of the solid laser rod in order to prevent an excessive concentration of the pumping laser in the vicinity of the rod center. The pumping distribution recited in this publication is different from the pumping distribution to be proposed by the present invention, however. That is, the deviation of the optical axis in the SSLD of this publication is determined by the focusing device that supports the optical waveguide. Thus, in the SSLD of this publication, if the axial deviation is to be changed by design, the structure of the focusing device must be modified.

The optimum deviation of the optical axis of the pumping laser with respect to the rod center for obtaining an optimum uniformity of the thermal distribution in the solid laser rod depends on the conditions such as the diameter of the laser rod, the density or wavelength of the lasing element, the beam intensity or beam distribution of the pumping laser from the waveguide, and the temperature or flow rate of the cooling medium flowing adjacent to the laser rod surface. Thus, if at least one of these conditions is changed in the conventional SSLD, another focusing device having an optimum axial deviation should be designed. This renders the design and fabrication of the SSLDs to be inefficient and raises the equipment costs of the SSLDs.

In the SSLD of FIG. 8, the optical axis of the pumping laser is deviated from the rod center so that the pumping laser is reflected by the mirror surface disposed around the laser rod for obtaining a uniform absorption distribution. However, this SSLD is not suitable for obtaining a higher efficiency and higher beam intensity by using an optimum absorption distribution, and does not afford an effective laser beam for use in the field of mechanical machining.

In the SSLD of FIG. 1 wherein the pumping laser is directly irradiated, or in the SSLD of FIG. 2 wherein a collimator lens is used for the pumping laser, variations of the incidence angle of the pumping laser cause variations of the pumping energy distribution in the laser rod. This causes an unstable operation of the solid laser or variations of the output characteristics depending on the species of the SSLD.

In addition, the location, beam size or beam shape of the pumping laser may vary depending on the positioning error of the laser diode or the lens thereof. This results from the fact that the optical system for the pumping laser is implemented by an image optical system, which may return the pumping laser beam reflected by the laser rod toward the laser diode. The reflected laser beam may be concentrated on the active layer of the laser diode, thereby rendering the operation of the laser diode unstable or significantly reducing the operational lifetime of the laser diode.

In each of the SSLDs of FIGS. 6 to 8 wherein an optical waveguide is used instead of the image optical system having such a problem, both the thickness of the waveguide and the number of the waveguides should be as small as possible in order to prevent the pumping laser from being leaked from the optical waveguide. This causes a difficulty in introduction of the pumping laser into the waveguide without using the image optical system, which has an inherent optical loss and increases the total optical loss.

In view of the above problems, it is an object of the present invention to provide a diode-pumped SSLD lasing with a higher efficiency.

It is another object of the present invention to provide a diode-pumped SSLD suitable for use in the filed of mechanical machining.

The present invention, in one aspect thereof, provides a solid-state laser device (SSLD) including a cylindrical laser rod for absorbing pumping laser to generate solid-state laser, a cooling member disposed radially outside and co-axially with the laser rod, a mirror member having a substantially cylindrical inner surface disposed radially outside and co-axially with the cooling member, the mirror member having an opening for receiving therethrough pumping laser and a mirror surface for reflecting a portion of the pumping laser passed by the laser rod, the laser rod receiving the pumping laser through the opening and focusing the portion of the pumping laser not absorbed in the laser rod at a focal point substantially on the mirror surface.

In accordance with an aspect of the present invention, for achieving the focal point being substantially on the mirror surface, an optical conjugate relationship is employed between the focal point and the opening with respect to the laser rod by forming a suitable positional relationship.

In the SSLD of the present invention, a small area of the mirror surface disposed at the focal point can reflect the second portion of the pumping laser beam substantially in an opposite direction or a desired direction toward the laser rod. Thus the laser rod can absorb the reflected portion of the pumping laser beam with a higher efficiency, substantially without scattering of the reflected portion of the pumping laser beam toward outside the mirror surface.

More specifically, the configuration that the focal point and the opening are conjugate with each other causes that the pumping laser passing the opening diverges toward the lasing rod, which then focuses the diverged pumping laser by the function of the cylindrical surface thereof to form a substantially parallel ray within the laser rod. The laser rod absorbs a first portion of the pumping laser to emit solid laser, passes a second portion of the pumping laser, and focuses the second portion by the function of the cylindrical surface thereof on the mirror surface of the mirror member, which reflects the second portion substantially in the direction opposite to the incident second portion or desired direction toward the laser rod. The laser rod then receives the substantially entire second portion of the pumping laser without scattering thereof to emit solid laser.

The cooling tube and the cooling medium flowing between the laser rod and the cooling tube may contribute a portion of the lens function of the laser rod.

The term "substantially cylindrical inner surface" as used herein means that the inner surface has a shape of a circle or a polygon as viewed along the central axis of the laser rod or the inner surface.

It is to be noted in the above configuration that the portion of the pumping laser beam passed by the laser rod during the first incidence can be reflected by the mirror surface substantially at the focal point. Thus, it is sufficient that the mirror surface have a small area. This allows a larger number of openings to be formed in the mirror member without causing leakage of the portion of the pumping laser from the openings.

The above and other objects, features and advantages of the present invention will be more apparent from the following description, referring to the accompanying drawings.

PREFERRED EMBODIMENTS OF THE INVENTION

In a preferred embodiment of the present invention, an optical waveguide is provided at the opening for guiding the pumping laser beam from the laser diode to the laser rod. It is preferable that the optical waveguide have an emission end which is parallel to a plane passing the central axis of the laser rod and the optical axis or central axis of the optical waveguide. It is preferable that the distance between the laser diode and the receiving end of the optical waveguide be about half the thickness of the waveguide. In this case, 98% of the pumping laser emitted by the laser diode can be effectively introduced into the waveguide without using lens.

In a practical example, the optical waveguide is of a rectangular shape in cross section thereof, which has longer sides parallel to the central axis of the laser rod. The waveguide may have a thickness of 1.3 mm to 1.8 mm. The relatively thick waveguide allows a larger positioning tolerance, i.e., allows a larger positioning error between the waveguide and the laser diode. An excessively larger thickness of the waveguide, however, reduces the number of waveguides to be disposed for a unit length of the laser rod.

Figure 11:
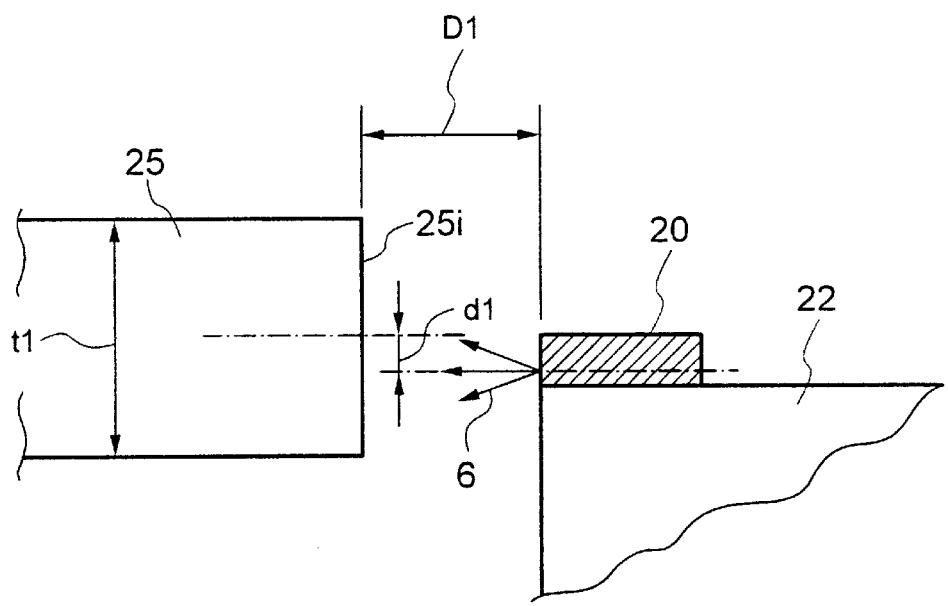
FIG. 11 is a schematic detailed view showing the positional relationship between the waveguide and the laser diode.

FIG. 11 shows the positional relationship between the laser diode and the optical waveguide, as viewed parallel to the central axis of the laser rod. The optical waveguide 25 has a thickness (t1) of 1.5 mm in the direction normal to the central axis of the laser rod. The laser diode 20 emits a laser beam which has a divergence whole angle of 30 degrees, for example. It is defined therein that d1 and D1 are the deviation distance between the optical axis of the laser diode 21 and the central axis of the waveguide 25 and the distance between the emission end of the laser diode and the receiving end of the waveguide, respectively.

Figure 12:
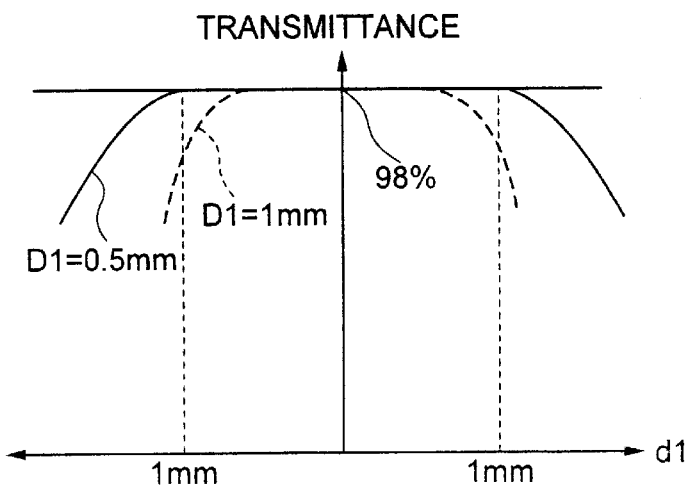
FIG. 12 is a graph showing transmittance of the waveguide plotted against the deviation of the optical axis between the waveguide and the laser diode.

FIG. 12 shows the transmittance measured for the pumping laser transmitted from the laser diode to the laser rod. The transmittance is plotted on ordinate against the deviation d1 plotted on abscissa. The solid line shows the case of D1=0.5 mm and the dotted line shows the case of D1=1 mm. This graph indicates that the tolerance for deviation d1 may be 1 mm at the maximum if the distance D1 is 0.5 mm.

In addition, it is also confirmed that the tolerance for d1 is 0.5 mm if the distance D1 is 1 mm. Without using a lens, a transmittance of 98% can be obtained with these tolerances. The tolerance for d1 is substantially determined by the receiving end 25i and the ratio of the thickness t1 of the optical waveguide 25 and the distance D1. The present inventor found by experiments and theoretical calculation that the optimum thickness of the waveguide resides between 1.3 mm and 1.8 mm for the case of nine directions of pumping.

The optical waveguide may have a uniform thickness or a tapered thickness as viewed along the optical axis of the waveguide. The tapered thickness is such that the receiving end of the optical waveguide is larger than the emission end of the optical waveguide.

The emission end of the optical waveguide may have a planar surface which is normal to the central axis of the waveguide and parallel to the central axis of the laser rod.

Alternatively, the emission end surface of the optical waveguide may be inclined with respect to the surface, which is normal to the central axis of the waveguide and parallel to the central axis of the laser rod, toward the circumferential direction. In this case, the optical axis of the pumping laser is deviated from the central axis of the laser rod, and the pumping laser advances in a direction deviated from the central axis of the laser rod during a first incidence due to the optical diffraction. In this case, it is preferable that 70 to 99% of the energy of the pumping laser emitted from the inclined emission end of the waveguide be introduced into the laser rod during the first incidence, i.e., before reflectance.

If the inclined emission surface is employed in the waveguide, the deviation (axial deviation) between the peak position of the pumping laser introduced into the laser rod and the rod center can be controlled as desired by the inclined angle of the emission end of the optical waveguide and the distance between the laser rod and the emission end. In other words, the design for the waveguide alone can control the axial deviation, with the other structure for the SSLD body being fixed. This allows control of the axial deviation by using the waveguide having the inclined emission end without changing or replacing the SSLD body itself. In this case, if the control of the axial deviation is required for matching the conditions of the SSLD such as the radius of the laser rod, density of the lasing element, pumping wavelength, intensity or intensity distribution of the pumping laser, the temperature or flow rate of the cooling medium, and the laser output power required, it is sufficient to design the inclined surface and location of the waveguide.

Figure 8:
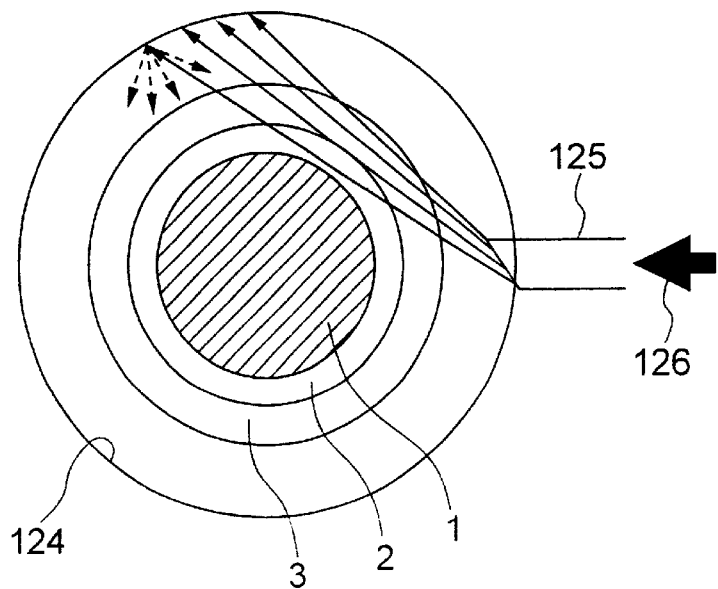
FIG. 8 is a sectional view of another conventional SSLD.
Figure 9:
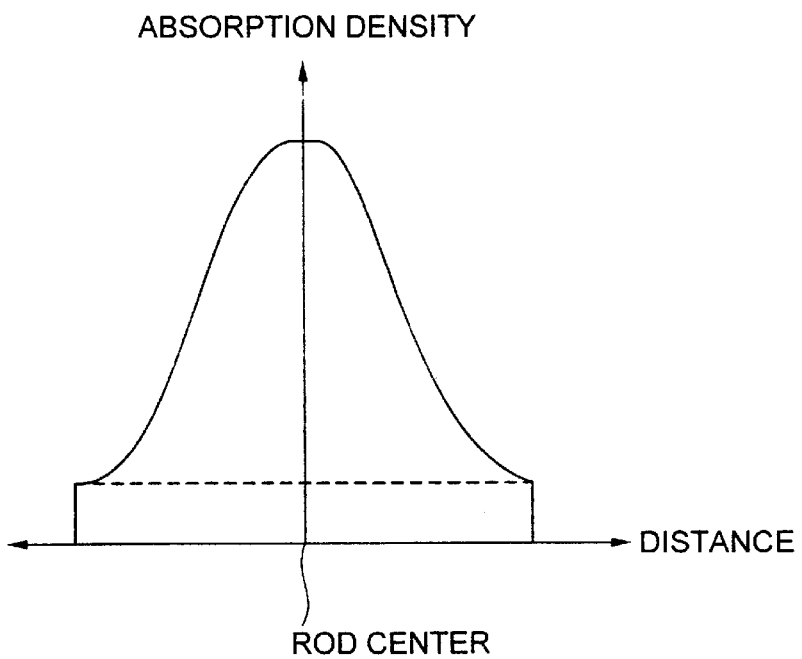
FIG. 9 is a graph showing an energy absorption distribution in the laser rod in a conventional SSLD.

More specifically, a variety of pumping conditions can be presented by changing the waveguide without changing the SSLD body itself, thereby reducing the design and fabrication costs for the SSLDs having different specifications. It is to be noted that at least 70% of the energy of the pumping laser should be introduced into the laser rod during the first incidence in the present invention. This is different from the conventional SSLD of FIG. 8, wherein the optical path is controlled for suppressing the introduction of the pumping laser into the laser rod in the first incidence.

Figure 13:
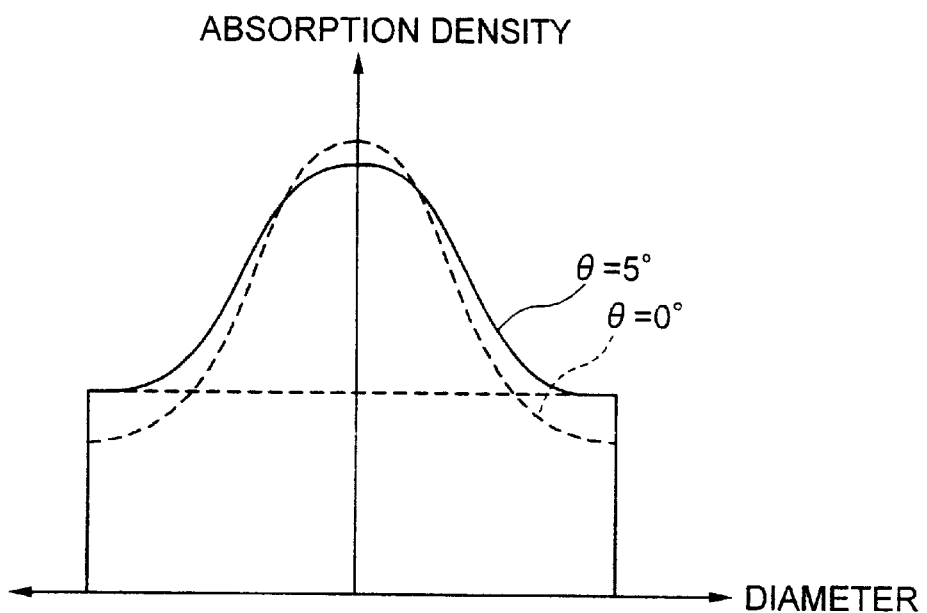
FIG. 13 is a graph showing energy absorption distribution with a parameter of inclined angle.

Referring to FIG. 13, there is shown a result of calculation of a pumping laser absorption distribution, with a parameter of the inclined angle θ of the optical axis of the pumping laser with respect to the central axis of the waveguide passing through the rod center. In the calculation, it is assumed that a Nd:YAG laser rod having an outer diameter of 5 mm is pumped from nine directions which are equally separated in the angular direction, and that the distance between the emission end of the waveguide and the central axis of the laser rod is 5 mm. In the obtained graph, the solid line indicates the case of θ=5°, and the dotted line indicates the case of θ=0°.

Figure 10:
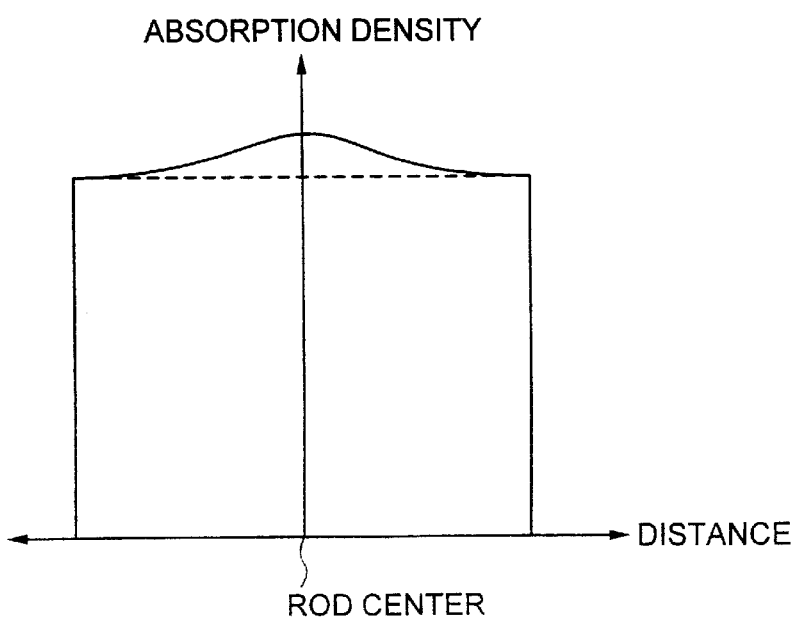
FIG. 10 is a graph showing another energy absorption distribution in the laser rod in a conventional SSLD.

By inclining the emission end surface of the waveguide by five degrees, the steep absorption peak is moderated and thus it is expected to alleviate the thermal lens effect of the solid-state laser. In addition, further inclination of the emission end surface of the waveguide provided a substantially flat absorption distribution such as shown in FIG. 10, wherein the absorption is reduced in the central region of the laser rod and increased in the peripheral region. In this case, however, the scattering of the absorbed energy degraded the lasing efficiency of the laser rod.

The cylindrical mirror member may preferably support a plurality of waveguides arranged with a constant angular distance therebetween as viewed from the central axis of the laser rod. The inclined angles and the senses of the inclination of the emission end surfaces are preferably equal among all the arranged waveguides as viewed along the circumferential direction.

The cylindrical mirror member may preferably support the waveguides in number of nine or more. A more number of waveguides or pumping laser sources arranged with a constant angular pitch can provide a more symmetric energy absorption distribution.

The present inventor found that nine or more of the pumping laser sources significantly improved the one-path pumping-laser absorption distribution compared to a three- or five-pumping-source scheme, wherein the absorption distribution has a noticeable peak at the angular direction of the pumping laser source. The nine or more of the pumping laser sources afford a substantially co-axial circular absorption distribution. The co-axial circular absorption distribution allows a lens provided outside the SSLD to correct a distortion of the wave surface of the pumping laser beam caused by the thermal lens effect, thereby stabilizing the lasing oscillation and allowing a higher output beam quality of the laser rod.

Both the distance D2 between the central axis of the laser rod and the emission end surface of the waveguide and the distance D3 between the central axis of the laser rod and the mirror surface of the cylindrical mirror member should be preferably equal to $nr/(n-1)$, wherein "r" and "n" are the radius of curvature of the outer surface of the laser rod and the refractive index of the laser rod, respectively.

In the above relationships, it is to be noted that the value $nr/(n-1)$ is in fact an approximation formula when the refractive indexes of the cooling water and the cooling tube are considerably lower compared to that of the laser rod. That is, more strictly, the above relationships should be considered for the "n" including the influence by the refractive indexes of the cooling water and the cooling tube.

Thus, both the distances should be determined at the value $nr/(n-1)$ within an allowable deviation range of ±30%, or more preferably within an allowable deviation range of ±20%. The distances thus determined allow the pumping laser emitted from the waveguide. to be collimated in the laser rod to form a parallel ray, travel toward the mirror surface while being focused thereon after passing the laser rod, and reflected by the mirror surface toward the laser rod. The spot size of the focused pumping laser assumes substantially a minimum on the mirror surface.

The mirror surface is preferably a part of the cylindrical surface of the cylindrical mirror member having a circular shape as viewed in cross section thereof.

In an alternative, the mirror surface may be at least a part of a polygon having a center on the central axis of the laser rod, as viewed in cross section thereof. In this case, since the reflecting portion of the mirror surface is a plane, the structures of the mirror member and the support thereof can be simplified, whereby the fabrication accuracy can be improved. The focusing scheme having a focal point substantially on the mirror surface alleviates scattering of the pumping laser even with the planar structure of the mirror surface, whereby substantially all the reflected pumping laser can be introduced again to the laser rod during a second incidence.

The mirror surface may be implemented as a gold film having a thickness of 1 to 3 μm and formed on the inner surface of the mirror member by a plating technique, an evaporation technique or a sputtering technique.

The waveguide preferably has a coat film on the emission end thereof wherein the reflectance of the coat film increases with the increase of the incidence angle of the external laser, with the minimum reflectance being at the incidence of zero degrees. For example, the coat film has a reflectance of 50 to 80% for the external laser at the incidence angle of 20 degrees or more. The "incidence angle" as used herein is measured from the perpendicular of the emission end.

By employing the coat film on the emission end, the pumping laser returned from the laser rod can be reflected toward the laser rod and does not cause an optical loss, provided that the incidence angle is larger than about 20 degrees. It is considered that the incidence angle of the returned pumping laser is generally larger than 20 degrees due to the reflection by the cooling tube and the cylindrical surface of the laser rod.

In a practical example, the absorption density of the pumping laser in the vicinity of the rod center is maintained between $5 \times 10^7$ watts/m$^3$ and $15 \times 10^8$ watts/m$^3$, which may be two or three times higher than the absorption density in the vicinity of the side surface of the laser rod. This affords an excellent beam overlapping of the energy absorption distribution with that of the output laser beam, as well as dominance by the lower-order transverse mode lasing. In addition, the optical loss due to the thermal distortion and the mechanical strength of the laser rod are maintained in a practical range to thereby improve the efficiency and the brightness of the diode-pumped SSLD.

Figure 1:
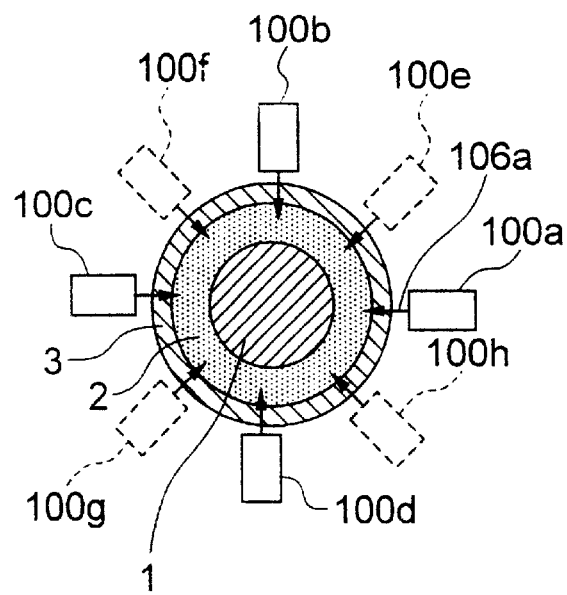
FIG. 1 is a sectional view of a conventional SSLD.
Figure 2:
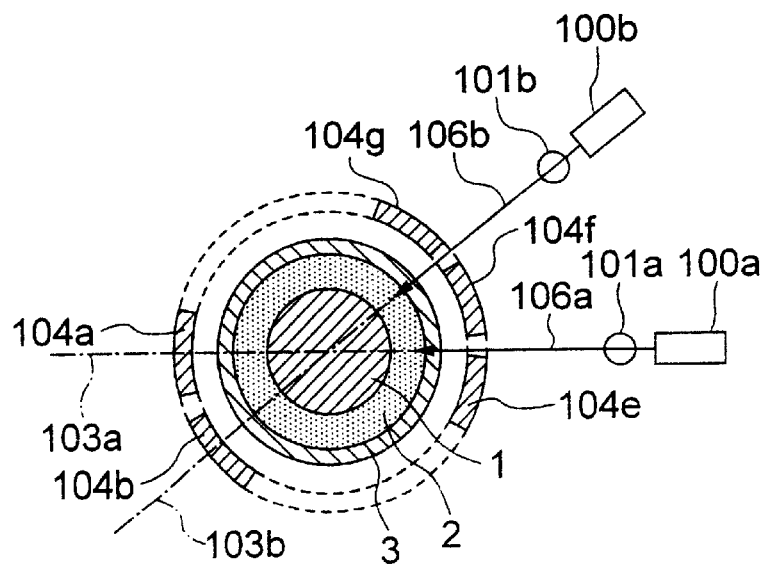
FIG. 2 is a sectional view of another conventional SSLD.
Figure 3:
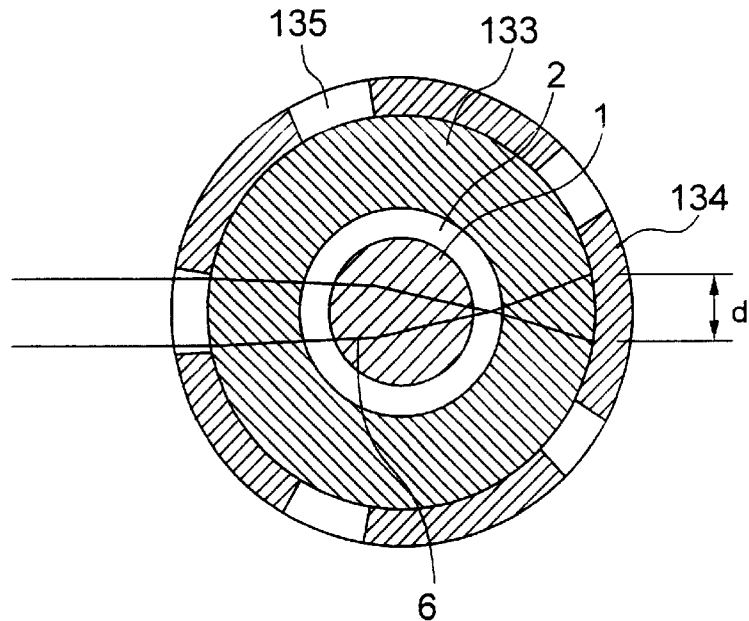
FIG. 3 is a sectional view of another conventional SSLD.
Figure 4:
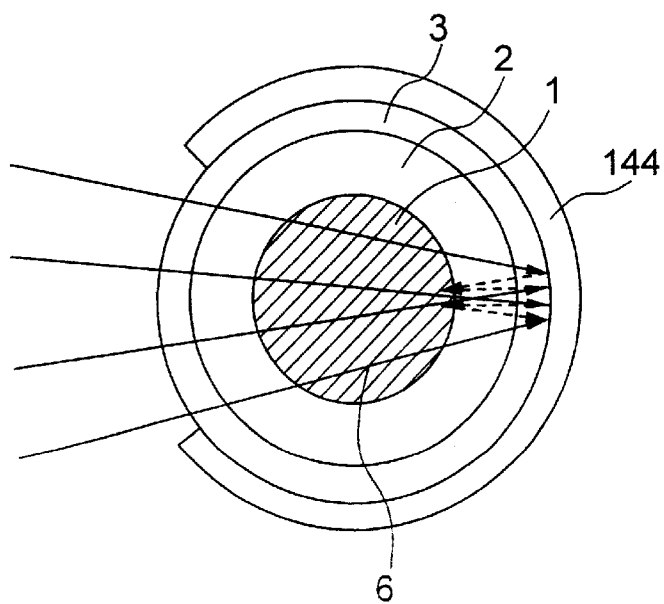
FIG. 4 is a sectional view of another conventional SSLD.
Figure 5:
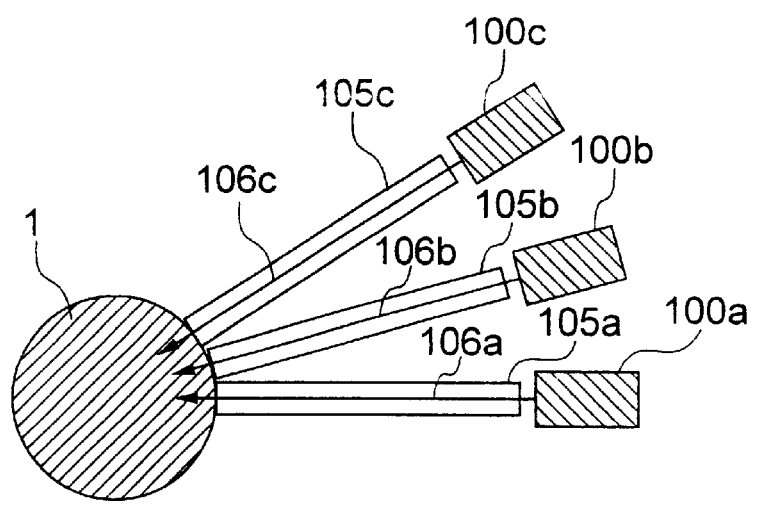
FIG. 5 is a sectional view of another conventional SSLD.
Figure 6:
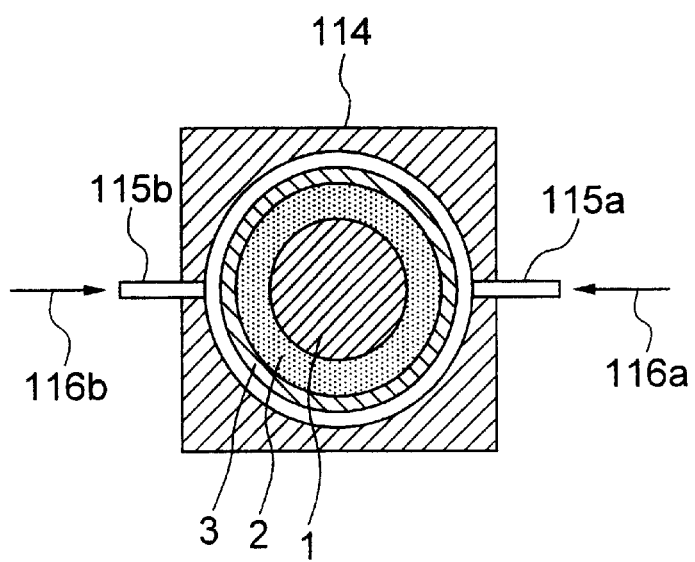
FIG. 6 is a sectional view of another conventional SSLD.
Figure 7:
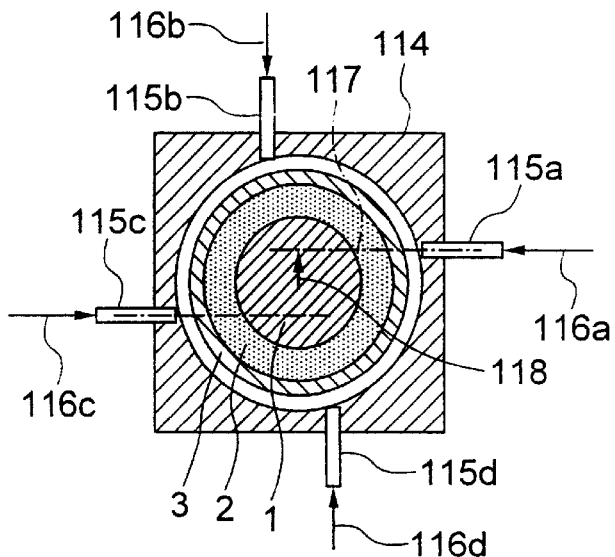
FIG. 7 is a sectional view of another conventional SSLD.

In the conventional SSLD of FIG. 2, the ratio of the absorption energy between at the rod center and at the side surface of the laser rod is designed four times or more. However the present inventor has found that the suitable ratio resides between two and three, with the absorption energy at the rod center being higher. If the ratio is above three, the laser output power is reduced and unstable, or the beam brightness is degraded, with the same pumping energy levle. On the other hand, if the ratio is below two, the laser output power is reduced, or the output laser beam quality is degraded, with the same pumping energy level.

This is considered due to the reduction of the energy conversion ratio and the increase of ratio of the higher-order mode lasing. In addition, it was found that the increase of the overall pumping energy up to a level causing an absorption density of $15 \times 10^8$ watts/m$^3$ in the vicinity of the rod center resulted in reduction or instability of the output laser power, even with the absorption ratio between at the rod center and at the side surface being maintained constant.

The pumping energy at the receiving end of the waveguide is preferably between 10 and 20 watts per unit centimeter of the laser rod for each pumping laser. This configuration allows the pumping laser to be introduced into the waveguide directly from the laser diode mounted on a chip without using a lens. Recently, laser diodes each capable of generating 40 watts or more per unit centimeter of the laser rod are in practical use. By using such a laser diode at an output power which is half the rated output power thereof, the operational lifetime of the laser diode is expected to increase by an order, whereby the reliability of the laser diode can be improved.

Now, the present invention is more specifically described with reference to concrete examples thereof and the accompanying drawings, wherein similar constituent elements are designated by similar reference numerals throughout the drawings.

Figure 14:
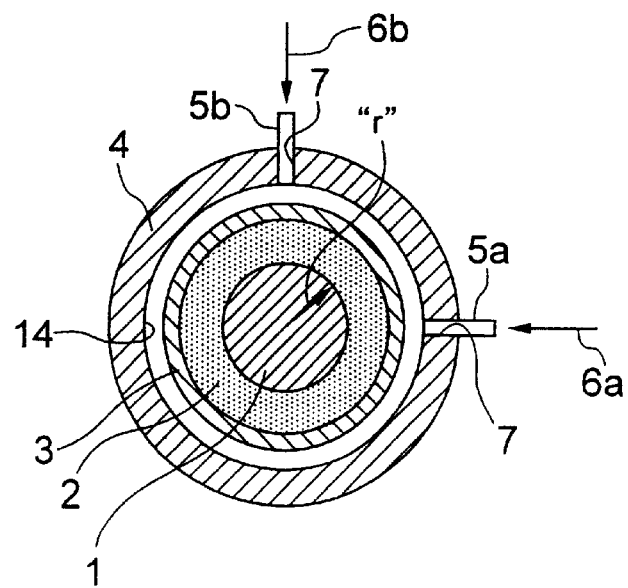
FIG. 14 is a sectional view of a diode-pumped SSLD according to a first embodiment of the present invention.

Referring to FIG. 14, a diode-pumped SSLD according to a first embodiment of the present invention includes a cylindrical, transparent Nd:YAG laser rod 1 having a radius of 2.5 mm, a cooling tube 3 having an outer radius of 5 mm and disposed outside and co-axially with the laser rod 1, and a cylindrical mirror member 4 having an inner radius of 6 mm and disposed outside and co-axially with the cooling tube 3.

The cooling tube 3 is made of quartz glass. Pure water flows within the space 2 between the laser rod 1 and the cooling tube 3 in the direction parallel to the central axis of the laser rod 1.

The side surface of the laser rod 1 is polished to form a smoothed surface for avoiding scattering of the pumping laser at the side surface. In addition, the inner and outer surfaces of the cooling tube 3 are also polished to form smoothed surfaces. The cooling tube 3 has, on the outer surface thereof, a dielectric coat film which functions as an anti-reflection film having a lower reflectance for the pumping laser. The cylindrical mirror member 4 is made of stainless steel and supported by a support member (not shown), with a specified space being maintained between the mirror member 4 and the cooling tube 3. The laser rod. 1 and the cooling tube 3 have substantially the same length, whereas the mirror member 4 has a length somewhat smaller than the length of the laser rod 1 and the cooling tube 1.

The mirror member 4 has an inner surface polished and plated with gold to form a mirror surface 14. The mirror surface 14 is implemented as a regular reflection surface, which reflects the pumping laser so that the reflection angle is equal to the incidence angle. The space between the mirror member 4 and the cooling tube 3 is filled with a cleaned dry air for preventing a reduction of the reflectivity of the mirror surface due to stain, rust, corrosion or deterioration of the mirror surface 14.

The mirror member. 4 has a pair of through-holes or. openings 7, disposed with an angular distance of 90 degrees therebetween as viewed from the central axis of the laser rod 1. A pair of waveguides 5 (5a, 5b) are inserted and fixed in the respective openings 7 for introducing pumping laser beams from outside the mirror member 4. Each of the waveguides 5a and 5b has an elongate rectangular shape at the emission end surface and the receiving end surface,. the longer sides thereof extending parallel to the central axis of the laser rod 1. Each of the waveguides 5a and 5b has an optical axis passing through the central axis of the laser rod 1. The mirror surface 14 receives the pumping laser passed by the laser rod at the focal points of the pumping laser beams, or in the close proximity of the focal points.

Each of the waveguides 5a and 5b is made of a glass plate having parallel opposite surfaces, and is 1 mm thick in the direction normal to the central axis of the laser rod 1. Each of the emission end and the receiving end of each of the waveguides 5a and 5b is coated with an anti-reflection dielectric film having a lower reflectance for the wavelength of the pumping laser. The other surfaces of the waveguide 5a or 5b may be coated with an overcoat for prevention of leakage of the pumping laser.

Pumping laser beams 6a and 6b are received through the receiving ends of the waveguides 5a and 5b, respectively. The laser beam may be emitted from a single laser diode or a plurality of laser diodes in a diode array. In the latter case, a lens may be provided for the plurality of laser diodes to shaping the laser beams to introduce the same through the receiving end of the waveguide 5a or 5b. The laser beam introduced into the waveguide 5a or 5b is emitted through the emission end thereof toward the laser rod 1 after passing through the waveguide 5a or 5b.

Figure 15:
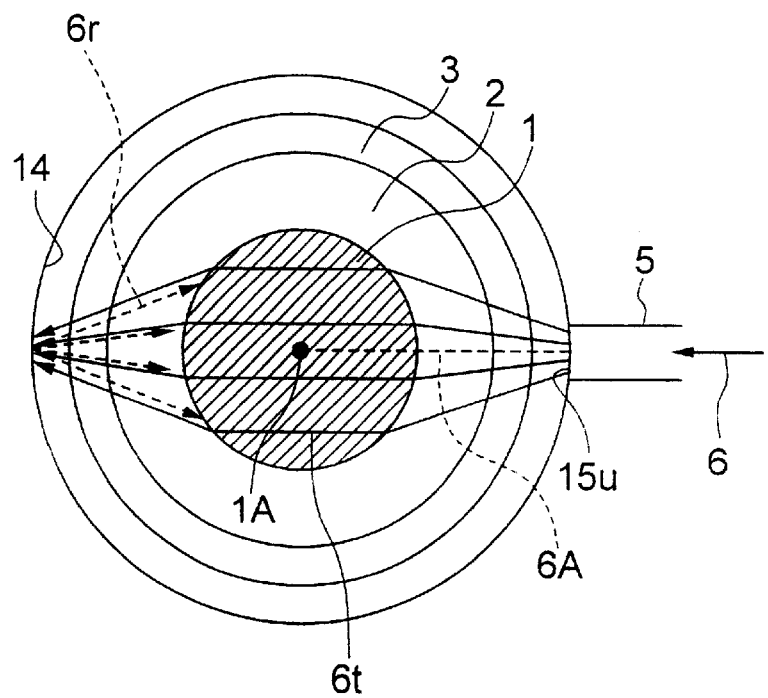
FIG. 15 is a sectional view of the SSLD of FIG. 14 for showing the optical path of the pumping laser.

Referring to FIG. 15, the optical path of one of the laser beams is shown in the SSLD of the present embodiment. The pumping laser 6 introduced into the waveguide 5 advances toward the laser rod 1 while being diverged, collimated by the side surface of the laser rod 1 to form a parallel ray 6t, advances toward the mirror surface 14 while being focused at the focal point in the close proximity of the mirror surface 14, reflected by the mirror surface 14 to advance toward the laser rod 1 through the optical path 6r substantially equal to the optical path before reflection.

In the present embodiment, the path line of the optical path having a maximum intensity of the pumping laser is called the optical axis of the pumping laser. In this definition, the optical axis 6A passes or intersects the central axis 1A of the laser rod 1. The pumping laser not absorbed in the laser rod 1 during passing the same is refracted by the rear side of the laser rod 1, and focused on the mirror surface 14 at the location which is conjugate with the emission end of the optical waveguide 5 with respect to the central axis of the laser rod 1. The focused laser is reflected toward the laser rod 1 so that each small beam is reflected in the direction symmetric with the incidence direction thereof with respect to the plane passing through the optical axis 6A of the pumping laser and the central axis 1A of the laser rod 1. Thus, the pumping laser not absorbed in the laser rod 1 is again incident, substantially without scattering thereof, onto the laser rod 1, which then absorbs the reflected pumping laser 6r to emit solid-state laser beam.

The focal point of the pumping laser disposed on or in the vicinity of the mirror surface affords reduction of the area of the mirror surface needed for reflection. Thus, a larger number of waveguides 5 can be disposed for the single laser rod 1, without causing interference between the mirror surface and the openings.

Figure 16:
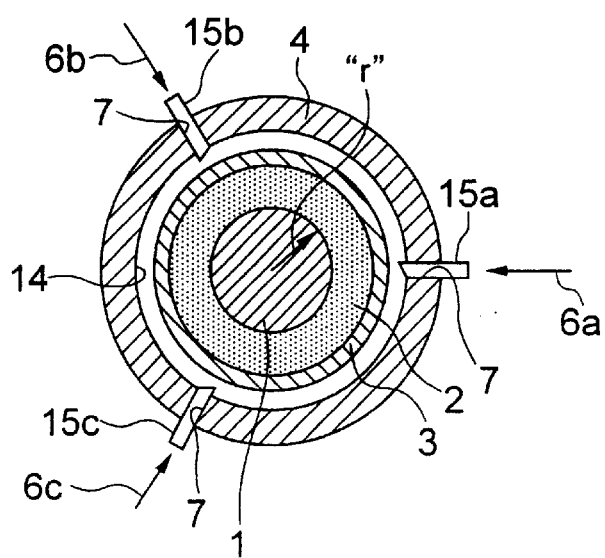
FIG. 16 is a sectional view of a diode-pumped SSLD according to a second embodiment of the present invention.

Referring to FIG. 16, a diode-pumped SSLD according to a second embodiment of the present invention is similar to the first embodiment except for the number of waveguides provided for the laser rod and for the configuration of the emission ends of the waveguides.

More specifically, three waveguides 15 (15a, 15b, 15c) are arranged for the unit length of the laser rod 1, with a constant angular distance therebetween. Each of the emission ends of the waveguides 15 is inclined by 5 degrees with respect to the plane normal to the central axis of the corresponding waveguide 15 and parallel to the central axis 1A of the laser rod 1. The directions (or sense) and angles of the inclination for the emission ends as viewed in the circumferential direction are common to the waveguides. The inclined angle is set at 5° in this example.

Figure 17:
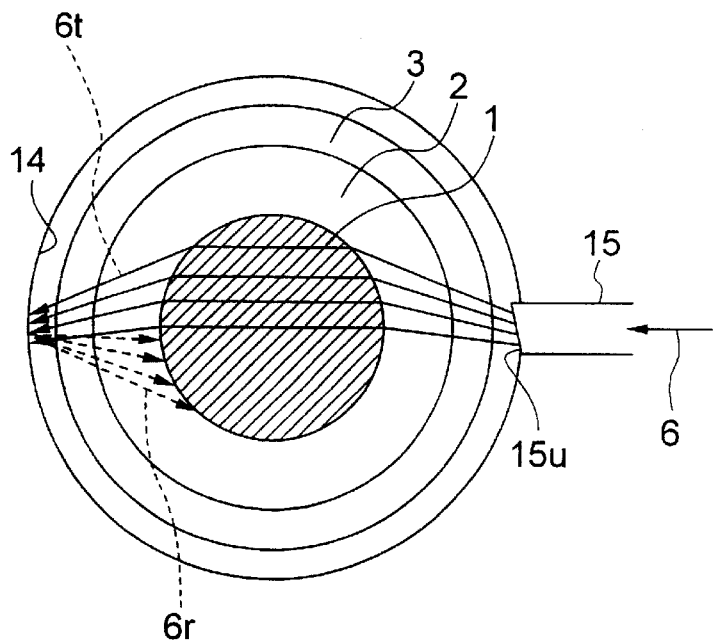
FIG. 17 is a sectional view of the SSLD of FIG. 16 for showing the optical path of the pumping laser.

Referring to FIG. 17, the optical axis of the pumping laser 6 emitted from the emission end 15u of the waveguide 15 is deviated from the central axis of the laser rod 1 due to the refraction at the inclined emission end 15u. The pumping laser introduced in the laser rod 1 is collimated and, absorbed by or passes the laser rod 1. In this embodiment, although the optical axis of the pumping laser in the laser rod 1 deviates from the central axis of the laser rod 1 by about 0.7 mm, 90% of the pumping laser energy is introduced into the laser rod 1 during the first incidence before reflectance. It is preferable that 70–99% of the pumping laser energy be introduced into the laser rod during the first incidence.

In the first incidence, the absorption peak in the absorption distribution of the laser rod which occurs in the central region of the laser rod is moderated by deviating the optical axis of the pumping laser from the central axis of the laser rod, while preventing the increase of the absorption in the peripheral region of the laser rod.

The pumping laser not absorbed during the first incidence is then reflected by the mirror surface 14 and advances along the paths which are in symmetry with the optical paths of the pumping laser before reflection with respect to the plane passing the focal point and the central axis of the laser rod 1. The pumping laser is then introduced into the laser rod during a second incidence and absorbed in the region of the laser rod which is in symmetry with the region of the absorption during the first incidence. Thus, the pumping laser not absorbed during the first incidence is absorbed during the second incidence substantially without scattering of the pumping laser.

In the first and second embodiments, $nr/(n-1)$ assumes 5.5 mm due to the refractive index "n" of the Nd:YAG laser rod being 1.82, whereby the inner radius (6 mm) of the mirror member is ten percents larger than $nr/(n-1)$. In the present embodiment, both the distance between the central axis of the laser rod and the emission end of the waveguide 15u and the distance between the central axis of the laser rod and the mirror surface 14 are determined at $nr/(n-1)$ or within the deviation range of ±30% therefrom, where n and r is the refractive index and the radius of curvature, respectively, of the laser rod.

The above distances are determined for obtaining the focal point of the pumping laser. on the mirror surface, while assuming that only the laser rod acts as the lens and that the emission end is one of the focal points of the laser rod. More strictly, however, "r" should be determined larger than the actual radius of the laser rod, because the cooling medium and the cooling tube have refractive indexes larger than 1. In the first and second embodiments, since pure water is used as the cooling medium and quartz glass is used for the cooling tube, the approximation is relatively correct due to the smaller refractive indexes of these materials compared to the refractive index of the laser rod.

Figure 18:
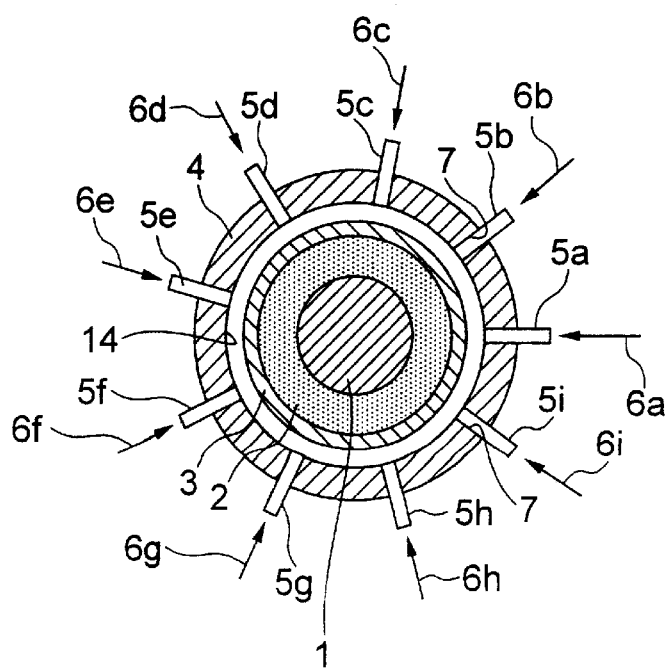
FIG. 18 is a sectional view of a diode-pumped SSLD according to a third embodiment of the present invention.

Referring to FIG. 18, a diode-pumped SSLD according to a third embodiment of the present invention is similar to the first embodiment except for the number and dimensions of the waveguides. More specifically, the SSLD has a cylindrical Nd:YAG laser rod 1 having a radius "r" of 2.5 mm, a cooling tube 3 made of quartz glass having an outer radius of 5 mm and co-axially disposed for introducing cooling medium or pure water around the laser rod 1, and a mirror member 4 made of stainless steel having an inner radius of 6 mm and disposed co-axially with the laser rod.

The mirror member is coated with a 1-$\mu$m-thick gold film. The mirror member has nine through-holes or openings 7 arranged at a constant angular distance, i.e., 40 degrees, for a unit length of the laser rod. Each through-hole 7 receives therein a waveguide 5 for introducing therethrough a pumping laser beam.

The optical axis of the waveguide 5 intersects the central axis of the laser rod 1. The waveguide 5 is made of glass plate similarly to the first embodiment, and has a thickness of 1.5 mm. The distance between the emission end of each waveguide 5 and a corresponding pumping diode is as small as 0.5 mm. The emission end of each waveguide 5 is parallel to the plane passing through the central axis of the laser rod and the optical axis of the each waveguide.

According to the theoretical calculations by the present inventor, the number "nine" of the pumping directions is sufficient for alleviating the excessive peak absorption along the optical axis of the pumping laser in the laser rod. This suppresses the disturbance to which the wave surface of the pumping laser is subjected in the vicinity of the rod center, and reduces the loss of the laser resonator, whereby the SSLD lases at a higher output power with a higher efficiency. The function of the laser rod and the pumping laser is similar to that in the first embodiment.

Figure 19:
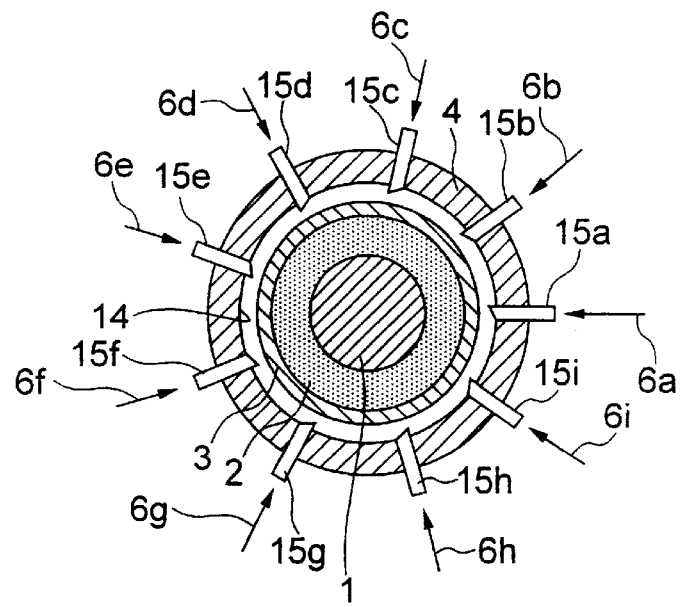
FIG. 19 is a sectional view of a diode-pumped SSLD according to a fourth embodiment of the present invention.

Referring to FIG. 19, a diode-pumped SSLD according to a fourth embodiment of the present invention is similar to the third embodiment except for the inclined structure of the emission end of each of the waveguides 5 in the present embodiment, which is similar to that described in the second embodiment.

More specifically, the emission end of the waveguide 5 is five degrees inclined with respect to the plane normal to the central axis of the waveguide and parallel to the central axis the laser rod 1. In this situation, the optical axis of the pumping laser emitted from the emission end of each waveguide 5 is 0.7 mm deviated from the central axis of the laser rod 1. This deviation affords a higher symmetry of the absorption distribution, and suppresses the absorption density of the pumping laser to a moderate level in the vicinity of the rod center while suppressing the absorption density to a lower level in the peripheral region.

The present embodiment achieves advantages similar to those in the third embodiment, and an advantage that larger tolerances can be obtained as to the difference between the output power levels of the pumping laser beams, the difference in the absorption characteristics due to the variations of the wavelength, and the alignment error between the central axis of the laser rod and the optical axis of the pumping laser during the fabrication of the SSLD. The present embodiment also achieves advantages similar to those achieved in the second embodiment.

Figure 20:
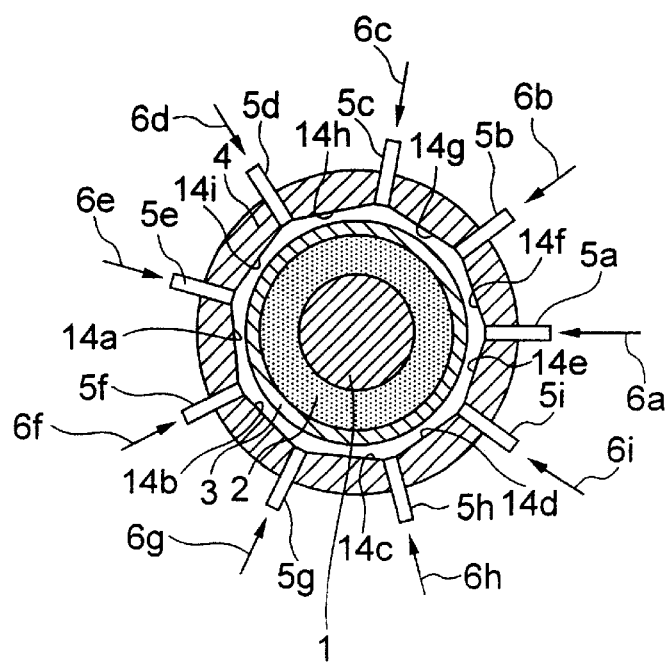
FIG. 20 is a sectional view of a diode-pumped SSLD according to a fifth embodiment of the present invention.

Referring to FIG. 20, a diode-pumped SSLD according to a fifth embodiment of the present invention is similar to the third embodiment except for the structure of the mirror member which has planar mirror potions in the present embodiment.

More specifically, the inner surface of the mirror member 4 is of a regular polygon having nine (odd number) apexes as viewed along the central axis of the laser rod 1. The mirror surface 14 thus includes nine planar surface portions 14a to 14i. This structure affords feasibility of fabrication, increase of efficiency for the materials, and improvement of the fabrication accuracy, and thus improves the cost performance of the SSLD. The through-hole 7 for receiving the waveguide 5 is formed at the apex of the polygon, whereas the pumping laser is reflected at the center of the side of the polygon.

Figure 21:
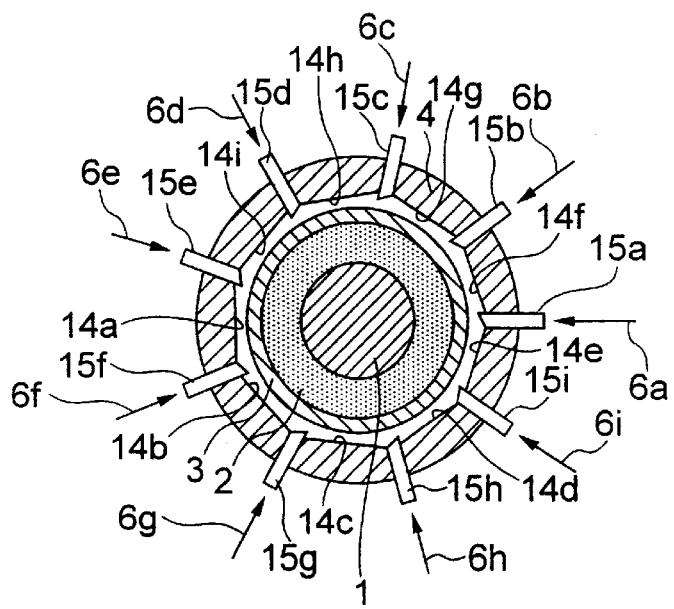
FIG. 21 is a sectional view of a diode-pumped SSLD according to a sixth embodiment of the present invention.

Referring to FIG. 21, a diode-pumped SSLD according to a sixth embodiment of the present invention is similar to the fifth embodiment except for the structure of the emission end of the waveguides 15, which is similar to that of the fourth embodiment.

The present embodiment achieves advantages similar to those of the fourth embodiment and the fifth embodiment.

Figure 22:
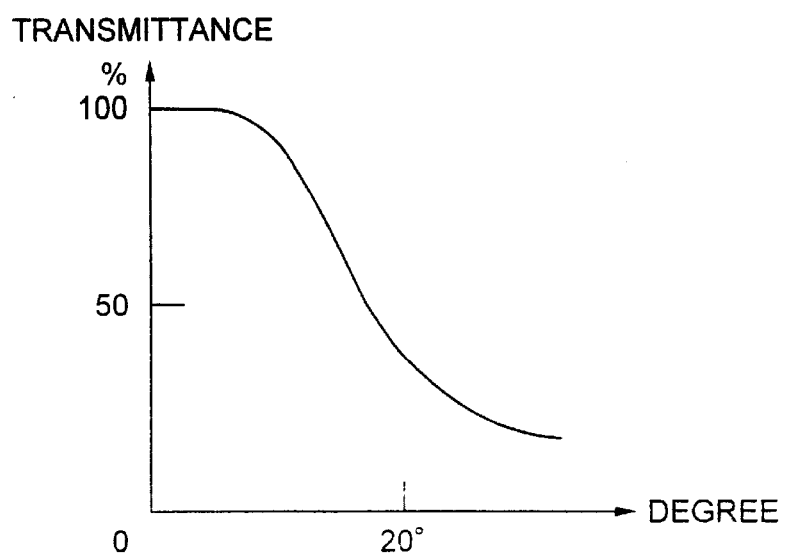
FIG. 22 is a graph showing incidence angle dependency of the transmittance of the emission end of the waveguide.

The emission end may be preferably coated with a coat film having a minimum reflectance at the incidence angle of zero degrees with respect to the perpendicular to the emission end surface, and a higher reflectance with a larger incidence angle. In a practical example, the coat film has a reflectance of 50 to 80% at an incidence angle of 20 degrees. FIG. 22 shows this example wherein the transmittance (percents) or a complement of the reflectance is plotted on the ordinate against the incidence angle plotted on the abscissa.

In FIG. 21, it is shown that the coat film passes almost all (more than 99%) of the incident pumping laser at the incidence angle of zero. This is achieved by the pumping laser emitted from the emission end surface.

The transmittance reduces rapidly with the increase of the incidence angle, and assumes below 50 percents at an incidence angle of 20 degrees. In other words, more than half the incident laser cannot pass the emission end surface. The incidence angle dependency of the transmittance achieves suppression of passing of the reflected pumping laser through the emission end surface of the waveguide. This prevents malfunction of the laser diode and affords reduction of the leakage of the pumping laser, thereby improving the stability of the SSLD and raising the absorption efficiency of the pumping laser.

In the above embodiments, the leakage of the pumping laser emitted from the emission surface of the waveguide and not used for the absorption is as low as several percents, for example, and does not raise a substantial problem. Especially, the inclined structure of the emission end of the waveguide wherein the emission end surface is inclined by ±5° further reduces the leakage of the pumping laser.

In the above embodiments, Nd:YAG is exemplified as the laser medium in the laser rod. However, any other lasing element such as Yb, Ho, Tm, Cr and Ti may be used in the laser medium of the present invention. In addition, YLF, YVO4 or GGG, a crystalline material such as GSGG, or an amorphous material such as glass and ceramics may be used as the base material for the laser medium. Moreover, the waveguide may be made of any of materials, other than the exemplified glass, having a high transmittance for the pumping laser. In particular, a high-refractive-index glass added with lead is preferably used for the waveguide due to the total reflection of the pumping laser.

Crystalline materials having a transparency and a high refractive index, such as sapphire and YAG including no lasing element, may be used as the material for the laser rod. The laser rod may have a desired diameter depending on the structure of the SSLD. The wavelength of the pumping laser, which is exemplified at 808 nm in the embodiment, may be selected depending on the laser crystal, the absorption distribution etc.

In the above embodiment, the waveguides in the embodiments are made of glass plates having parallel surfaces. However, the opposite surfaces of the waveguide may be not parallel. For example, the waveguide may have tapered structure wherein the receiving end has a larger thickness than the emission end.

Figure 23:
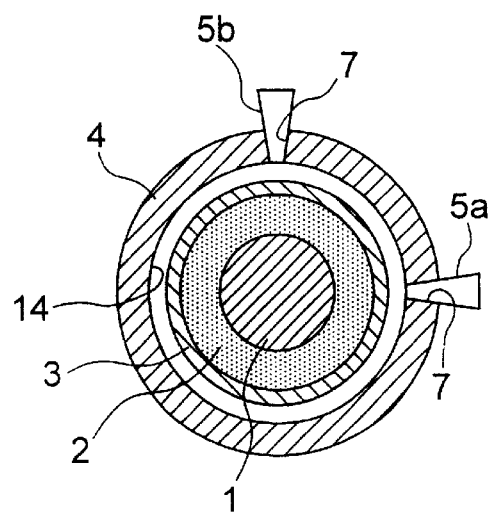
FIG. 23 is a sectional view of a modification of the embodiment of FIG. 14.
Figure 24:
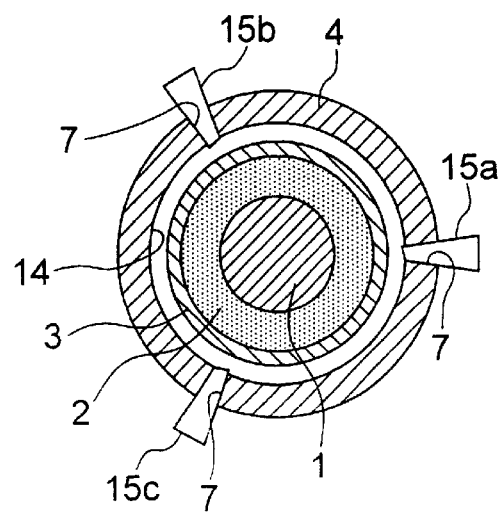
FIG. 24 is a sectional view of a modification of the embodiment of FIG. 16.

Referring to FIGS. 23 and 24, there are shown waveguides each having the tapered structure. The embodiment of FIG. 23 is similar to the first embodiment except for the tapered structure, whereas the embodiment of FIG. 24 is similar to the second embodiment except for the tapered structure. The tapered structure improves the coupling efficiency between the waveguide and the laser diode. The tapered structure may be applied to any other embodiment.

In the above embodiment, the mirror member is made of stainless steel having a cylindrical shape and coated with a gold film at the inner surface thereof. The mirror member may be made of aluminum, copper, ceramic etc. The inclination of the emission ends of the waveguides, direction for the inclination, number of waveguides, positional relationship between the waveguides and the laser rod may be selected depending on the desired absorption distribution.

Each waveguide may have longer sides in the direction parallel to the central axis of the laser rod, and is associated with a plurality of diode lasers arranged in the direction of the laser rod.

In short, the present invention employs the positional relationship among the optical elements so that the pumping laser not absorbed by the laser rod during the first incidence of the pumping laser is efficiently reflected by the mirror surface toward the laser rod for absorption in the second incidence, and that a larger number of pumping laser beams can be used without leakage of the pumping laser beams not absorbed during the first incidence.

Figure 25:
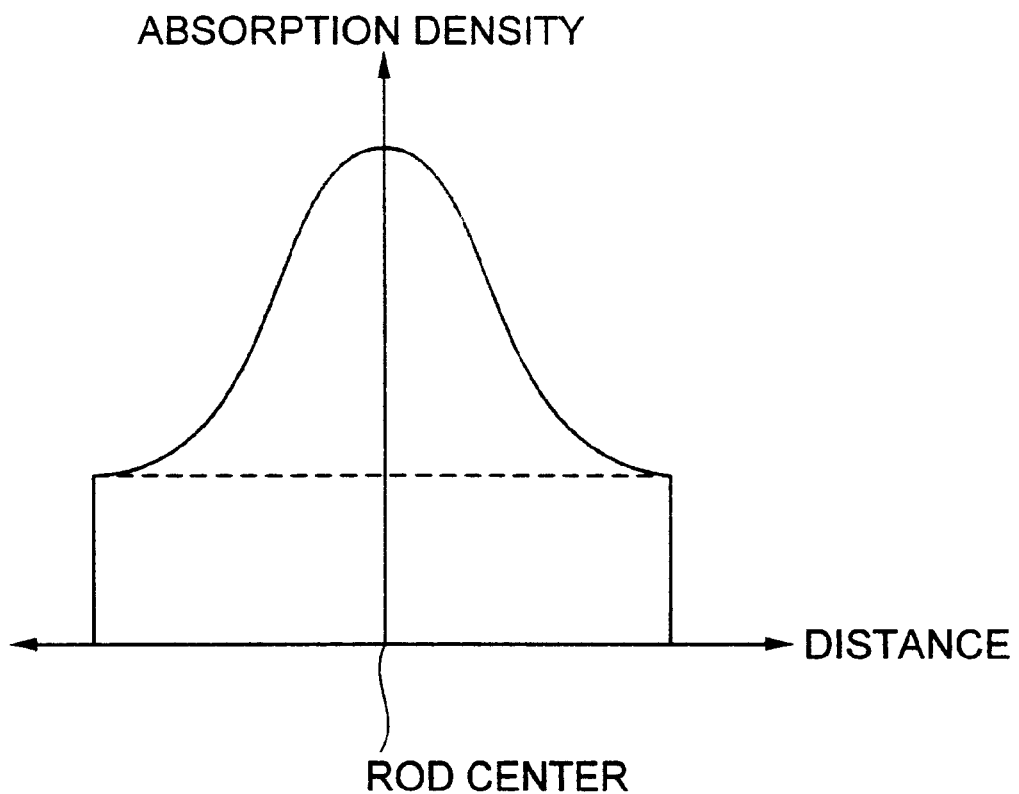
FIG. 25 is a graph showing an energy absorption distribution of the sample of the embodiment of FIG. 18.

Sample of the SSLD fabricated based on the embodiment of FIG. 18 were subjected to evaluation of the performances. During the evaluation, the pumping energy received in each waveguide is set at 20 watts/cm. The absorption distribution measured in the sample is shown in FIG. 25, wherein the absorption density is plotted on the ordinate against the radial distance from the rod center plotted on the abscissa. The absolute absorption density calculated theoretically is $15 \times 10^8$ watts/m$^3$ at a maximum at the rod center, and $6 \times 10^8$ watts/m$^3$ at the side of the laser rod.

According the experiments conducted by the present inventor, the SSLD achieved an energy conversion ratio between 35 and 40% in the case where the absorption density at the rod center was two to three times higher than the absorption density at the rod side. In addition, in this case, the lower-order transverse mode dominates for lasing to achieve further higher performance of the SSLD.

Experiments were conducted for the sample of the SSLD of FIG. 18, wherein the pumping energy was above 20 watts/cm and the absorption density was above $5 \times 10^8$ watts/m$^3$. In this case, it was confirmed that the energy conversion ratio was suddenly reduced, and at the same time, the fluctuation of the laser output power was increased. This is considered due to the higher pumping energy density in the vicinity of the rod center, resulting in increase of the thermal double refraction and thermal doublet lens effect. Thus, it was confirmed that the absorption energy in the vicinity of the rod center should not be more than $15 \times 10^8$ watts/cm$^3$.

In the embodiment of FIGS. 18 and 19, the pumping laser is emitted from, for example, a laser diode (type: SDL3470S) supplied from SDL inc. in USA. If the waveguides have a thickness of 1.5 mm, the tolerance for deviation d1 can be assured 1.0 mm at a maximum, with the distance D1 between the receiving end of the waveguide and the laser diode being 0.5 mm (shown in FIG. 11).

Other laser diodes such as OPC-A020-M M-CL (trade mark) from OptPower inc. in USA or TH-C1720-P (trade mark) from Tomson-CSF inc. in France may used for the pumping diodes.

If the waveguide has a longer receiving end suitable for receiving pumping laser from a plurality of laser diodes, TH-C1720-R(7) from Tomson-CSF inc. can be used wherein seven diodes are arranged in an array.

Laser diodes each having a higher rated output power, such as 30 watts or 40 watts lasers, can be used for the pumping diodes, each of which is required to output 20 watts/cm at a maximum. In this case, the lifetime of the laser diode can be increased due to the lower output power required.

In the above embodiments, if neodymium (Nd) laser is used for the pumping, a neodymium density of 0.6 at. percent allows an absorption of 98% or more in the laser rod during the first and second incidences.

Since the above embodiments are described only for examples, the present invention is not limited to the above embodiments and various modifications or alterations can be easily made therefrom by those skilled in the art without departing from the scope of the present invention.

For example, the mirror member my be formed as a cooling tube.

What is claimed is:

1. A diode-pumped solid-state laser device (SSLD) comprising a cylindrical laser rod for absorbing pumping laser to generate solid-state laser, a cooling member disposed radially outside and co-axially with said laser rod, and a mirror member having a substantially cylindrical inner surface disposed radially outside and co-axially with said cylindrical laser rod, said mirror member having an opening for receiving therethrough pumping laser and a mirror surface for reflecting a portion of the pumping laser passed by said laser rod, said laser rod receiving said pumping laser through said opening and focusing the portion of said pumping laser at a focal point substantially on said mirror surface.

2. The diode-pumped SSLD as defined in claim 1, wherein said focal point is optically conjugate with said opening with respect to said laser rod.

3. The diode-pumped SSLD as defined in claim 1 further comprising a waveguide inserted in said opening.

4. The diode-pumped SSLD as defined in claim 3, wherein said waveguide has an emission end of a rectangular shape.

5. The diode-pumped SSLD as defined in claim 4, wherein said waveguide has a receiving end of a rectangular shape having a larger thickness than said emission end.

6. The diode-pumped SSLD as defined in claim 4, wherein said emission end has a surface parallel to a plane, which is parallel to a central axis of said laser rod and normal to a central axis of said waveguide.

7. The diode-pumped SSLD as defined in claim 4, wherein said emission end has a surface inclined from a plane, which is parallel to a central axis of said laser rod and normal to a central axis of said waveguide.

8. The diode-pumped SSLD as defined in claim 7, wherein said laser rod receives therein said pumping laser from said waveguide in an amount of 70% or more of energy of said pumping laser at a first incidence.

9. The diode-pumped SSLD as defined in claim 4, said emission end has a length between 1.3 mm and 1.8 mm in a direction normal to a central axis of said laser rod.

10. The diode-pumped SSLD as defined in claim 3, wherein a plurality of said waveguides are inserted in a plurality of said openings.

11. The diode-pumped SSLD as defined in claim 10, wherein each of said waveguides has an emission end having a surface inclined to a specified direction as viewed in the circumferential direction from a plane which is parallel to a central axis of said laser rod and normal to a central axis of said each of said waveguides.

12. The diode-pumped SSLD as defined in claim 10, wherein said waveguides are provided in number of nine or more, and arranged at a constant angular distance with respect to a central axis of said laser rod.

13. The diode-pumped SSLD as defined in claim 3, wherein said waveguide has an emission end coated with a coat film having a higher reflectance for a higher incidence angle.

14. The diode-pumped SSLD as defined in claim 13, wherein said coat film has a reflectance of 50 to 80% at an incidence angle of 20 degrees.

15. The diode-pumped SSLD as defined in claim 3, wherein said laser rod has an absorption energy density of $5 \times 10_8$ to $15 \times 10^8$ watts/m$^3$ in a vicinity of a central axial of said laser rod, which is two to three times higher than an absorption energy density in a peripheral area of said laser rod.

16. The diode-pumped SSLD as defined in claim 15, wherein said waveguide emits said pumping laser in an energy level of 10 to 20 watts per unit centimeter of said laser rod for each pumping laser.

17. The diode-pumped SSLD as defined in claim 1, wherein both a distance between a central axis of said laser rod and said opening and a distance between said central axis and said focal point are equal to $nr/(1-n)$ where n is a refractive index of said laser rod and r is a radius of curvature of said laser rod.

18. The diode-pumped SSLD as defined in claim 1, wherein said mirror surface is substantially of a circle as viewed along a central axis of said laser rod.

19. The diode-pumped SSLD as defined in claim 1, wherein said mirror surface is substantially of a polygon as viewed along a central axis of said laser rod.

20. The diode-pumped SSLD as defined in claim 1, wherein said mirror surface is formed by a gold film coated on said inner surface and having a thickness between 1 $\mu$m and 3 $\mu$m.

* * * * *